United States Patent [19]
Bradac

[11] Patent Number: 5,482,343
[45] Date of Patent: Jan. 9, 1996

[54] VEHICLE DOOR AND WATER DEFLECTOR

[75] Inventor: William G. Bradac, Cleveland, Ohio

[73] Assignee: The Excello Specialty Company, Cleveland, Ohio

[21] Appl. No.: 279,445

[22] Filed: Jul. 25, 1994

[51] Int. Cl.[6] .................. B32B 3/28; B60R 27/00
[52] U.S. Cl. ............... 296/39.1; 296/146.7; 296/154; 428/80; 428/182; 49/502
[58] Field of Search ............... 296/39.1, 146.7, 296/152, 154; 428/80, 81, 174, 182, 194, 343; 49/502

[56] References Cited

U.S. PATENT DOCUMENTS

| | | |
|---|---|---|
| 3,220,544 | 11/1965 | Lovell . |
| 3,444,589 | 5/1969 | Bowin . |
| 3,684,642 | 8/1972 | Rogers, Jr. . |
| 3,778,101 | 12/1973 | Tsuda ................................ 296/154 |
| 4,588,627 | 5/1986 | Isaksen et al. . |
| 4,696,848 | 9/1987 | Jones et al. . |
| 4,865,791 | 9/1989 | Ferro et al. . |
| 4,873,132 | 10/1989 | Jones et al. . |
| 4,957,803 | 9/1990 | Foley ............................... 428/80 |

FOREIGN PATENT DOCUMENTS

| | | | |
|---|---|---|---|
| 2510721 | 9/1976 | Germany | 296/154 |
| 3510018 | 1/1986 | Germany | 296/146.7 |
| 234021 | 11/1985 | Japan | 49/502 |
| 31543 | 2/1987 | Japan | 296/39.1 |
| 314643 | 12/1989 | Japan | 296/39.1 |
| 808249 | 1/1959 | United Kingdom | 49/502 |

*Primary Examiner*—Dean Kramer
*Attorney, Agent, or Firm*—Fay, Sharpe, Beall, Fagan, Minnich & McKee

[57] ABSTRACT

A vehicle door construction having an outer door panel and an inner door panel with a trim panel joined to the inner door panel by attachment hooks extending from the trim panel into hook openings in the inner door panel. A plastic water deflector sheet is positioned between the trim panel and the inner door panel. The deflector sheet has through apertures corresponding to the locations of the hook openings in the inner door panel. The sheet also has a portion adjacent each through aperture that is laterally deformed to extend through the associated hook opening and form an awning-like hood over the corresponding hook.

17 Claims, 2 Drawing Sheets

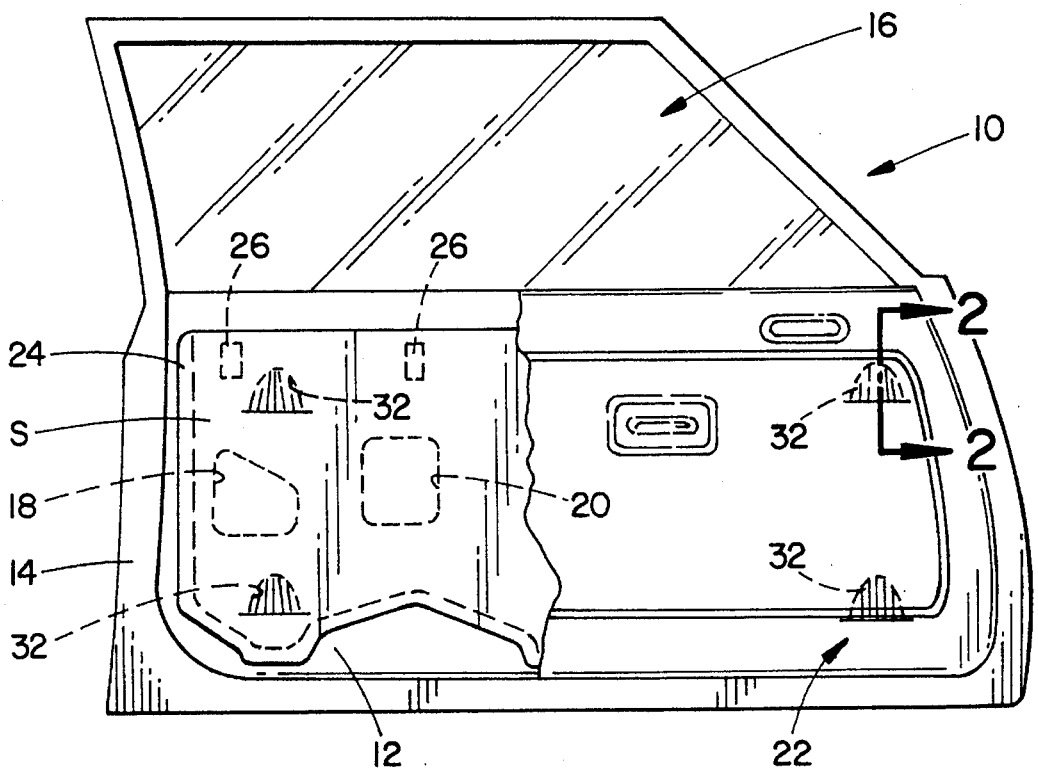
FIG. 1
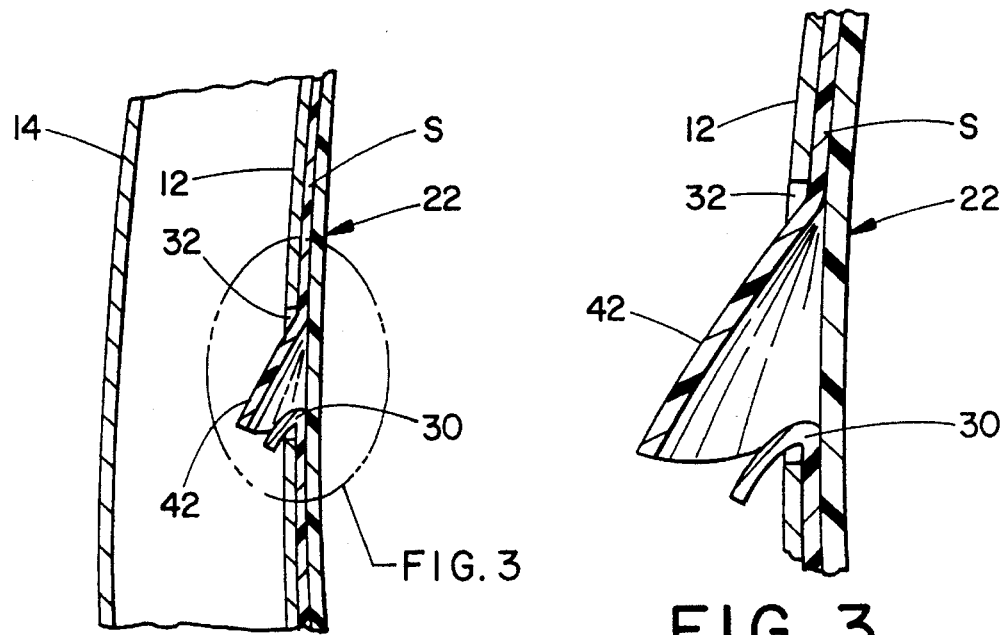
FIG. 2
FIG. 3

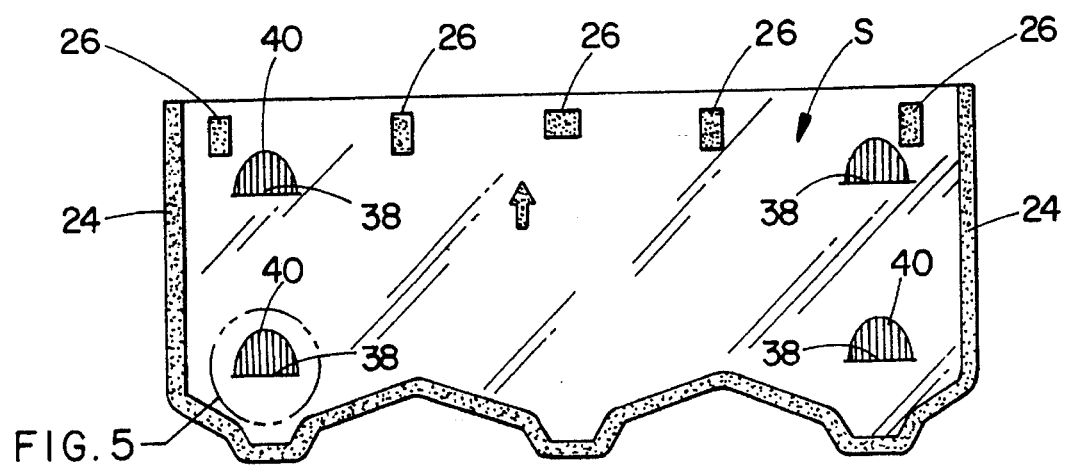
FIG. 4
FIG. 6
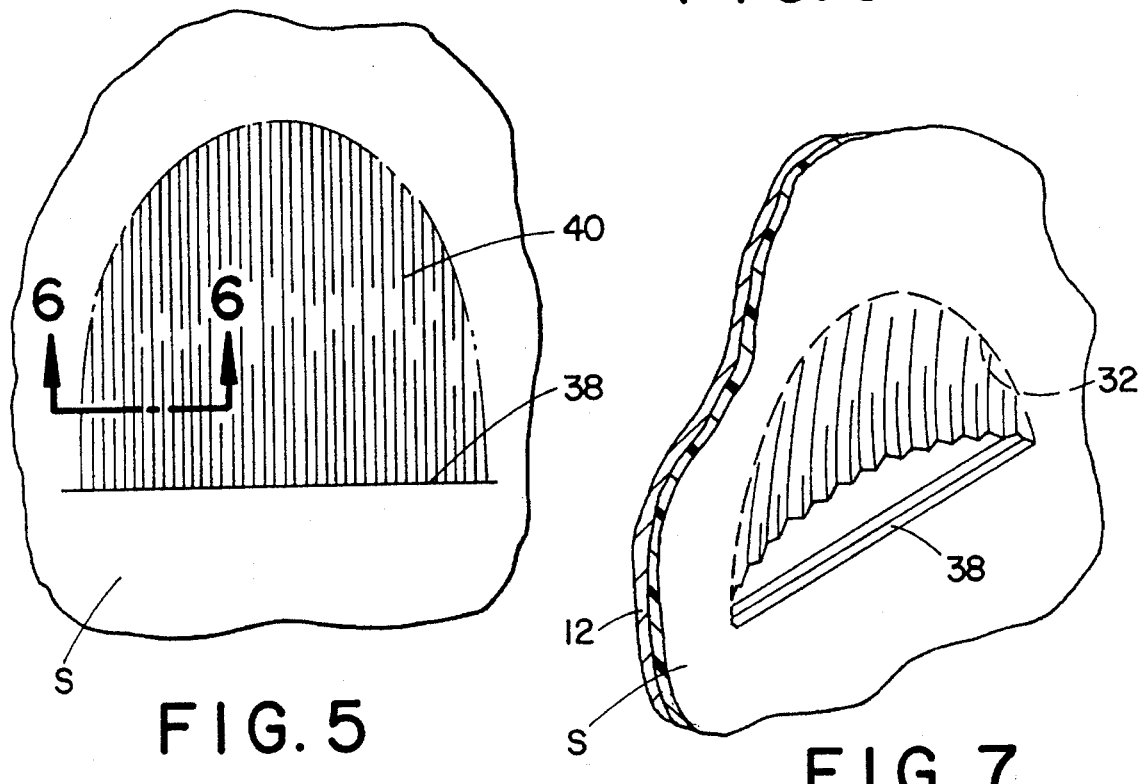
FIG. 5
FIG. 7

VEHICLE DOOR AND WATER DEFLECTOR

BACKGROUND OF THE INVENTION

The subject invention is directed to a vehicle door construction and a water deflector for use therein.

The general type of vehicle door construction with which this invention is concerned is shown in commonly assigned U.S. Pat. No. 4,588,627, issued May 13, 1986, for "Deflector for Vehicle Body Components." As shown therein, the doors typically include a first outer sheet metal panel which defines the door's exterior. A spaced inner sheet metal door panel reinforces the outer panel and defines the chamber which houses various mechanisms including window operators, latches, and the like. Openings through the inner door panel allow access to the mechanisms. A trim panel covers the inner door panel and provides the decorative interior for the door. Generally, a plastic water deflector sheet is joined to the face of the inner door panel to close the various openings and prevent water that gets within the interior of the door from wetting the interior surface of the trim panel.

The trim panels have been releasably connected to the inner door panel by many different techniques. Recently, some trim panels have been joined by hook members extending from the trim panel to hook over the edges of openings formed through the inner door panel. The hook members must, of course, extend through the plastic water deflector sheet in order to engage the inner door panel. This produces a possible leak path which is undesirable.

SUMMARY OF THE INVENTION

The subject invention provides a door construction and water deflector sheet arrangement which provides a satisfactory solution to the problem of leakage about the hook access openings. In particular, and in accordance with one aspect of the subject invention, a vehicle door of the type having an outer door panel and inner door panel with a trim panel joined to the inner panel by attachment hooks extending from the trim panel into the hook openings in the inner panel is provided with the improvement wherein the plastic water deflector sheet positioned between the trim panel and the inner door panel is provided with through apertures corresponding to the locations of the hook openings in the inner panel and the deflector sheet has a portion adjacent each through opening that is laterally deformed to extend through the associated hook opening and form an awning-like hood over the corresponding hook structure. By forming the sheet with the awning-like laterally extending portion, water coming downwardly through the inner door space is deflected or directed outwardly away from the hook opening. The awning-like structure prevents engagement of water with the hook and reduces the possibility of water infiltration through the hook opening.

Preferably, and in accordance with a further aspect of the invention, the awning-like hood portions formed in the sheet are formed by corrugating the sheet in the area adjacent the through opening. The corrugations extend the length of material adjacent the sheet through opening and allow it to be laterally deflectable out of the plane of the sheet. It is, of course, also possible to form the awning portions by thermoforming operations as are well known in the art. This is, however, less desirable from a production standpoint.

The location and number of awning-like portions in the water deflector sheet are, of course, positioned to correspond to the locations of the hooks on the inner door trim panel. In other particulars and respects, the water deflector sheet can be given any desired shape or provided with laterally deflectable pocket portions and the like as shown in the commonly assigned prior U.S. Pat. Nos. 4,873,132; 4,696,848; or 4,865,791, for example.

As can be seen from the foregoing, a primary object of the invention is the provision of a door construction and water deflector sheet design which allow the use of hook type mountings for joining the inner door trim panel to the inner door panel while preventing the formation of undesirable additional water leak paths.

A further object of the invention is the provision of a method of forming water deflector sheets so that they include laterally deflectable awning-like portions adjacent hook receiving openings or passages.

A still further object is the provision of a design for water deflector sheets wherein openings are provided with awning-like deflector portions associated therewith.

BRIEF DESCRIPTION OF THE DRAWINGS

The above and other objects and advantages will become apparent from the following description when read in conjunction with the accompanying drawings wherein:

FIG. 1 is a view showing a side elevation from the interior of a vehicle door structure incorporating the subject invention (portions are broken away to show certain features of construction more clearly);

FIG. 2 is a cross-sectional view taken on lines 2—2 of FIG. 1;

FIG. 3 is a greatly enlarged view of the circled area of FIG. 2;

FIG. 4 is a plan view of a water deflector sheet used in the door structure of FIG. 1;

FIG. 5 is a greatly enlarged view of the circled area of FIG. 4;

FIG. 6 is a cross-sectional view taken on lines 6—6 of FIG. 5; and,

FIG. 7 is a perspective view showing the water deflector sheet overlying the hook receiving opening in the inner door panel.

DETAILED DESCRIPTION OF THE PREFERRED EMBODIMENT

Referring more particularly to the drawings wherein the showings are for the purpose of illustrating a preferred embodiment of the invention only, and not for the purpose of limiting same, FIGS. 1 and 2 best illustrate a typical vehicle door assembly 10 comprising spaced inner and outer door panels 12 and 14 formed from sheet metal and joined about their peripheral edge with a space therebetween for accommodating various internally mounted operating mechanisms such as window operators, speakers, and the like. A window 16 is arranged to move within the space between the inner and outer panels 12 and 14. The inner panel 12 is formed to have a somewhat irregular or uneven contour for housing and mounting the various mechanisms and accessories thereon and for providing optimum strength. In addition, various access openings, such as openings 18 and 20, are formed through the inner door panel to permit access to the mechanisms within the door.

The door structure thus far described is fairly typical and it is possible that the door of the subject invention could have a variety of other configurations and access openings through the inner panel provided at a variety of different locations.

Extending over the inner door panel and joined thereto is a door trim panel structure 22. The door trim panel provides a decorative cover and overlay for the inner door panel and is formed from a variety of different materials including metal and fabric combinations, molded plastic, and the like as is well known. The inner door panel 22 in such door structures must be releasably connected to the inner door sheet metal panel so that access can be had to the interior of the door for maintenance and/or repair of the various mechanisms and components mounted therein. The presence of the noted openings and passages through the inner door panel require that steps be taken to prevent water from entering from the interior of the door through these openings into engagement with the door trim panel and damaging the trim panel. For this reason, it has been the practice to use water deflector sheets which are placed on the interior surface of the door inner panel 12 to overlie and effectively close the various openings 18, 20 and the like. Water deflector sheets of the general type under consideration are shown and described, for example, in commonly assigned U.S. Pat. No. 4,588,627 of May 13, 1986 for "Deflector for Vehicle Body Components." The disclosure of this patent is incorporated herein by reference. As shown therein, the deflector sheets generally comprise one or more relatively thin flexible sheets of a suitable plastic such as polyethylene in the range of between 5 and 10 mils in thickness. It should be understood that other plastics and laminates having the desired characteristics could equally well be used.

The sheet is formed to have the desired peripheral shape to suitably overlie the inner door panel 12 and is releasably joined therein by the use, for example, of a pressure sensitive adhesive located in bands or strips 24 about the outer periphery of the sheet. In the FIG. 1 showing, the deflector sheet is identified with the reference letter S and is provided with a peripheral band of suitable pressure sensitive adhesive 24 about the vertical side edges and transversely across the bottom edge. Additionally, suitable spots of pressure sensitive adhesive 26 are positioned at various locations along the top edge of sheet S. Sheet S is shown more particularly and in greater detail in FIG. 4 and will subsequently be described with particular reference to the improvement features of the subject invention. For the present, however, it should be noted that the sheet S is incorporated into the door structure to lie between the openings 18 and 20 and the inner trim panel 22.

There have been various proposals for joining the trim panel to the inner door panel. Currently, it has been the practice to provide the trim panel with hook or hook-like fastener elements on its rear surface which can enter into and engage into suitable openings formed through the inner door panel 12. Referring particularly to FIGS. 2 and 3, the inner door panel 22 is shown as having hook-like protuberances 30 extending from the back side of the trim panel for engagement through openings 32 formed in the inner door panel 12. The number of hooks 30 and the corresponding openings 32 can vary widely and would, of course, be dictated primarily by the need to maintain proper engagement and holding of the trim panel to the inner door panel. Merely by way of possible example, the subject device is shown with four of the hooks 30 located generally at the corner areas of the inner door panel 22 and cooperating with corresponding openings 32 formed through the inner door panel 12.

As can be appreciated, in order to allow the hooks 30 to enter into and engage with the inner door panel in the manner illustrated in FIGS. 2 and 3, it is necessary to provide openings through the water deflector sheet S. This, of course, provides openings that could allow water that enters the interior space of the door, such as through the window access slot, to enter through the inner door panel 12 and engage the back side of the trim panel and cause damage thereto. The subject invention proposes to overcome this potential leak path and to reduce the possibility of water entry through the hook openings by forming the water deflector sheet such as to provide an awning-like, deformed portion to extend through the hook receiving opening to overlie the hook and act as a deflector and shield for water passing down through the interior chamber of the door. Preferably, in this regard, the openings 32 are formed generally in the manner shown dotted in FIGS. 1 and 7. That is, the openings have a generally transverse lower edge which can receive the hook 30 and is open above an amount sufficient to provide space for the deformed awning-like portion to extend through the door panel. The shape of the openings 32 could, of course, be significantly different from that shown provided they make provision for engagement by the hooks and provided significant space above the hook engagement area so as to provide room for the presence of the awning-like portion of sheet S.

Sheet S of the subject embodiment is shown in detail in FIG. 4. The FIG. 4 showing is from the reverse side from that illustrated in FIG. 1. Provided at each of the four general corners of the sheet S of FIG. 4 are suitable transverse slots or openings formed by a horizontal slit 38 at each location generally corresponding to the locations of the bottom edges of the inner door panel openings 32. The portion 40 above each of the transverse slits 38 is arranged so as to be deflected laterally (toward the viewer of FIG. 4) so as to provide the awning-like sections 42 shown in FIGS. 2 and 3. This laterally deflected awning-like portion could, if desired, be formed by known thermoforming techniques. According to the preferred form of the subject invention, however, this laterally deflectable awning-like portion is formed using the techniques illustrated and described in the commonly assigned prior U.S. Pat. Nos. 4,873,132; 4,865,791; and, 4,696,848 which are incorporated herein by reference. Preferably, and as best described in U.S. Pat. No. 4,865,791, the laterally deflectable portions 40 are formed by forming a series of relatively small and closely spaced corrugations to extend generally transversely of the slits 38. The area 40 is thus of significantly greater surface area after this formation than it was prior to the corrugation forming. The corrugations can have many shapes and sizes but are preferably shaped generally as shown in FIG. 6 and, for example, can have a total height in the range of ⅛ inch for plastic sheet having a thickness of 0.005 inches. Additionally, it is preferable that the corrugations be formed such that the crests and roots be disposed equal distances outwardly from the opposite sides of the sheet. The previously-mentioned U.S. Pat. No. 4,865,791 describes and illustrates in detail how such corrugations can be formed by cooperating interengaging and intermeshing tool members having a blade-like configuration to subject the sheet to localized stretching and permanent deformation in parallel closely arranged paths to produce the resultant corrugated appearance shown in FIG. 6. The greatly elongated transverse length of the material in the direction along the slit 38 thus allows the area 40 to have a substantial lateral deflection to enter through the openings 32 and form the required awning-like structure over the hook members 30.

In forming these laterally extensible areas 40, the actual corrugation forming can be formed prior to the cutting to form the slit or slot opening 38. That is, the sheet S can be deformed and the corrugations formed and then subsequent thereto, the slot can be cut into the sheets at the necessary locations.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. In the formation of a water deflector sheet from thin plastic for use in vehicle doors, a method of forming an access opening through the deflector sheet with the access opening having a laterally deflectable awning-like portion of deflector sheet adjacent thereto comprising:

forming an array of side-by-side corrugations in the sheet at the desired location of the awning-like portion adjacent the location of the desired opening with the desired opening through the sheet extending transversely of the array of corrugations.

2. The method as defined in claim 1 wherein the array of side-by-side corrugations are formed such that they pass through the desired location of the opening but terminate substantially immediately after passing therethrough.

3. The method as defined in claim 2 wherein the array of side-by-side corrugations is formed by selective deformation of the sheet.

4. The method as defined in claim 1 wherein the desired opening and the array of corrugations are positioned to intersect at nearly a right angle.

5. The method as defined in claim 1 wherein the array of side-by-side corrugations are formed parallel to one another.

6. The method as defined in claim 1 wherein the array of side-by-side corrugations is formed continuously across the desired opening location.

7. The method as defined in claim 1 wherein the opening is formed at the desired location after the array of side-by-side corrugations is formed.

8. A water deflector sheet for use in a vehicle door for protecting an inner door trim panel comprising:

a flexible sheet of plastic film having a size and peripheral shape to overlie the area which it is desired to protect;

an opening formed through the sheet; and, an array of individual closely spaced side-by-side corrugations formed in an area of the sheet adjacent the opening with a majority of the individual corrugations extending in a direction generally transverse of the opening and intersecting a periphery of the opening.

9. The water deflector sheet as defined in claim 8 wherein the closely spaced corrugations are generally parallel.

10. The water deflector sheet as defined in claim 8 wherein the opening is a narrow slit.

11. The water deflector sheet as defined in claim 10 wherein the array of corrugations has substantially its entire length on one side of the slit.

12. The water deflector sheet as defined in claim 10 where in the corrugations extend generally perpendicular to the slit.

13. The water deflector sheet as defined in claim 12 wherein the corrugations have substantially their entire length on one side of the slit.

14. In a vehicle door construction having an outer door panel and an inner door panel with a trim panel joined to the inner door panel by attachment hooks extending from the trim panel into hook openings in the inner door panel, the improvement wherein a plastic water deflector sheet is positioned between the trim panel and the inner door panel, the sheet having through apertures corresponding to the locations of the hook openings in the inner door panel with the sheet having a portion adjacent each through aperture being laterally deformed to extend through the associated hook opening and form an awning-like hood over the corresponding hook.

15. In a vehicle door construction as defined in claim 14, the improvement wherein each laterally deformed portion is comprised of an array of corrugations.

16. In a vehicle door construction as defined in claim 14, the improvement wherein the laterally deformed portion adjacent each through aperture is an internal portion of the sheet.

17. In a vehicle door construction as defined in claim 16, the improvement wherein each laterally deformed portion is comprised of closely spaced parallel corrugations extending from one side of the through aperture.

\* \* \* \* \*